United States Patent Office 3,632,673
Patented Jan. 4, 1972

3,632,673
GRAFT COPOLYMERS AND SUSPENSION PROCESS FOR THE MANUFACTURE THEREOF
William J. Heilman, Allison Park, Pa., assignor to Gulf Research & Development Company, Pittsburgh, Pa.
No Drawing. Filed Feb. 20, 1968, Ser. No. 706,779
Int. Cl. C08f *19/04, 33/08, 45/24*
U.S. Cl. 260—876 R                                  15 Claims

ABSTRACT OF THE DISCLOSURE

Polystyrenes are grafted onto poly(alpha olefins) by polymerizing a solution of the poly(alpha olefin) and benzoyl peroxide catalyst in a polymerizable styrene monomer while suspended in an aqueous medium.

---

This invention relates to a method for the production of graft polymers of ethylenically unsaturated monomers and to the products produced thereby. More particularly, this invention relates to the production of graft polymers of polymerizable styrene monomers.

Polymerized aromatic mono-olefins, such as polystyrene, have found wide usage and acceptance by virtue of their highly desirable properties including high strength, good electrical insulating properties and chemical resistance. However, high molecular polymers such as polystyrene are too brittle for many purposes, e.g., electrical insulators and the like. It has been proposed to combine various plasticizer materials with the polystyrene in order to improve its flexibility. However, many attendant disadvantages have been observed with these techniques including poor impact properties of the resulting product. On the other hand, attempts to improve the flexibility of the polystyrenes by the combination of the polystyrenes with various materials that also impart good impact strength have led to other difficulties in the final product including oxidation problems due to residual unsaturation therein.

It has now been found that high molecular weight polymers of a styrene monomer may be formed having both good flexibility, good impact properties, and which contain no unsaturation in the final product.

In accordance with the invention, a graft polymer of a styrene monomer is produced by the process which comprises, forming a solution comprising a polymer of an alpha olefin monomer in a polymerizable styrene monomer, admixing a benzoyl peroxide free radical initiator with the solution, suspending the resulting solution in an aqueous medium, and heating the suspension to a temperature at which a graft copolymer of the alpha-olefin and styrene forms.

Surprisingly, it has been discovered that bead-like graft copolymers of a styrene and a polymer of an alpha-olefin monomer that is soluble in the styrene monomer can be formed in the foregoing manner with the result that a styrene polymer having good flexibility and impact strength is produced. By treating the aqueous suspension of the solution of the preformed alpha-olefin polymer in the styrene monomer in this manner, the styrene monomer polymerizes and concomitantly becomes grafted onto the alpha-olefin polymer.

According to a preferred embodiment of the present invention, the bead-like graft copolymer product additionally comprises ungrafted styrene polymer. It is highly desirable to have such ungrafted polymeric material present, since it greatly enhances the impact properties of the copolymer product.

The alpha-olefin polymers that are suitable for employment in the process of the present invention are those which are soluble in a polymerizable styrene monomer.

It is vital to the success of the present invention that the olefin polymers be soluble in the styrene monomer, since otherwise the copolymer product will not have the desired impact properties. Thus, the alpha-olefin polymer must be a polymer of an alpha-olefin monomer having at least six carbon atoms per molecule. Suitable polymers include those produced from monomers containing between 6 and about 28 carbon atoms, and mixtures thereof, preferably between 6 and about 22 carbon atoms per molecule. Examples of suitable poly(alpha olefins) include the polymers of 1-hexene, 1-heptene, 1-octene, 4-methyl-1-pentene, 4-methyl-1-hexene, 4-ethyl-1-hexene, 6-methyl-1-heptene, 5-methyl-1-heptene, 1-nonene, 1-decene, 1-tridocene, 1-nonadecene, 1-eicosene, 1-heptacosene and the like. The preferred poly(alpha olefin) is poly-1-hexene.

The poly(alpha olefin) may be prepared by any suitable method known to the art. Suitable poly(alpha olefins) include those produced by polymerizing the foregoing monomers with a coordination catalyst, i.e., a reduced transition metal catalyst, in order to obtain a high molecular weight polymer. The catalyst may be suitably employed in the form of a slurry of very small particles in an inert medium e.g. cyclohexane. The coordination catalysts are complexes formed by the interaction of alkyls of metals of Groups I–III of the Periodic Table with halides and other derivatives of transition metals of Groups IV–VIII. For example, a highly desirable coordination catalyst that may be employed in the production of the poly(alpha olefin) is the complex formed between an aluminum alkyl and a titanium halide, e.g., triethyl aluminum and titanium trichloride.

Suitable polymerizable styrene monomers that may be polymerized and concomitantly grafted onto the polyolefin include styrene and substituted styrenes and may be represented by the formula

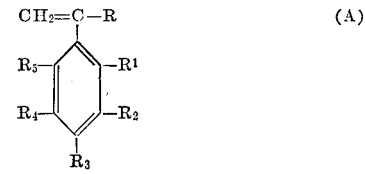

wherein $R$, $R^1$, $R^2$, $R^3$, $R^4$ and $R^5$ are the same or different and each represent hydrogen, an alkyl group, an alkoxy group, a halogeno group or a cyano group, particularly hydrogen, a lower alkyl group, a lower alkoxy group, a halogeno group or a cyano group. Thus, the term "styrene monomer" as employed herein is intended to include substituted styrenes as well as nonsubstituted styrene.

Representative styrenes having the general Formula A include, for example, styrene, alpha-methyl styrene, alpha-ethyl styrene, alpha-propyl styrene, alpha-butyl styrene, alpha-methoxy styrene, alpha-cyano styrene, alpha-chlorostyrene, alpha-bromostyrene, 2-chlorostyrene, 3,4-difluorostyrene, 4-alpha-dichlorostyrene, 2,4-dimethyl styrene, 3,4-dimethoxystyrene, alpha-cyanostyrene, 4-cyanostyrene, 4-isopropylstyrene, 3-trifluoromethyl - 4 - bromostyrene, 2 - trifluoromethyl-4-fluorostyrene, 2,4 - dibutoxystyrene, 2,4,6-trichlorostyrene, 3-methyl-4-methoxystyrene, 3-methyl-4-methoxy-5-isopropylstyrene, 3,4 - dimethyl - alpha-bromostyrene and the like.

The preferred polymerizable styrene monomers are those in which $R$ is hydrogen and $R^1$, $R^2$, $R^3$, $R^4$ and $R^5$ each represent hydrogen, a lower alkyl group or a halogeno group.

As previously mentioned, the alpha olefin polymer and the styrene monomer react in the presence of a benzoyl peroxide catalyst or free radical initiator. The employment of this particular catalyst is vital to the present invention. Although it is not desired to limit the present invention to any particular theory of operation, it is believed that the reactions involved and behavior of the benzoyl peroxide in the present process may be represented by the reactions hereinafter presented.

A poly(alpha olefin), such as polyhexene is prepared from 1-hexene, as shown by the reaction

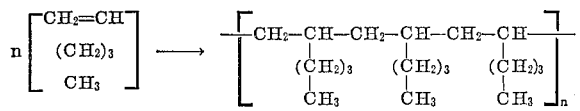

The polyhexene is then dissolved in a styrene monomer such as styrene, and benzoyl peroxide is added thereto. Next, the monomer solution is admixed with an aqueous medium with agitation to form a suspension of droplets of the monomer solution in the aqueus medium. The suspension is heated and the benzoyl peroxide breaks down to provide a free phenyl radical for initiating the desired reaction, as follows:

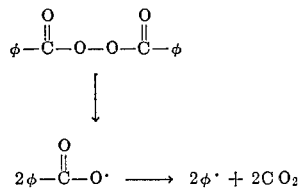

The free radical [$\phi\cdot$] is the initiator for the styrene polymerization and grafting operation. It preferentially attacks each tertiary hydrogen position in the polyhexene molecule, which positions are the most vulnerable in said molecule, to permit styrene to graft thereat as it polymerizes into polystyrene, although other hydrogen positions, such as secondary hydrogen, can also be attacked. The styrene polymerization and grafting mechanism proceeds as follows:

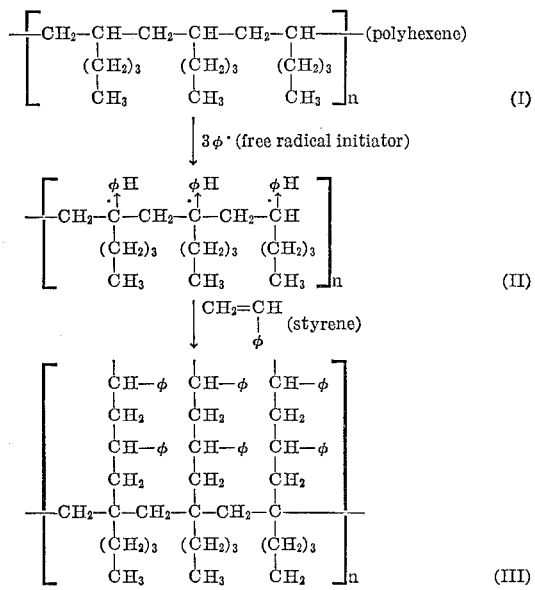

The Formula III represents polystyrene grafted onto polyhexene. As previously mentioned, the grafting occurs at the positions on the polyhexene that contain tertiary hydrogen atoms, since these represent the most vulnerable positions on the polyhexene. If the benzoyl peroxide only served to initiate polymerization of the styrene monomer, the product would comprise polyhexene and polystyrene as two separate polymers. This type of phenomenon occurs when initiators other than benzoyl peroxide are employed. However, the unique property of benzoyl peroxide is that it serves to remove the tertiary hydrogen atoms on the poly(alpha olefin) molecule thus permitting the formation of a polystyrene graft concurrently with the styrene polymerizaion. Therefore, a surprising feature of the present invention is this dual function of the benzoyl peroxide free radical initiator.

Upon viewing Formula III, it may be seen that the lateral polystyrene chains are free of polyhexene components. Furthermore, the graft copolymer is completely saturated and therefore is not subject to the oxidation problems connected with residual unsaturation in the product.

While the syrene polymer is grafted to the polyhexene backbone in the graft copolymer of the present invention in the manner shown, another unique feature of the invention is the presence of ungrafted styrene polymer in the bead-like product. The presence of such ungrafted polymer is highly desirable, since it imparts good impact properties to the polymeric product. It is for this reason that the alpha-olefin polymer employed in the present process must be soluble in the monomer, i.e. $C_6$ and higher alpha-olefin polymers. If a monomer other than a styrene were employed, in which the poly(alpha olefin) is insoluble, e.g., acrylonitrile, only a mechanical suspension of the poly(alpha olefin) in the monomer would be possible and no ungrafted polymer imparting improved impact properties would be present in the final product.

The bead or suspension polymerization process according to this invention initially involves the formation of a solution of the preformed poly(alpha olefin) in a polymerizable styrene monomer. The weight ratio of the styrene monomer to the poly(alpha olefin) employed may suitably be within the range of between about 5:1 and about 50:1, preferably between about 10:1 and about 20:1. Next, the benzoyl peroxide is dissolved in the poly(alpha olefin)-styrene monomer solution. This procedure is necessary, since if the benzoyl peroxide were dissolved in only the styrene monomer, an explosion would result by virtue of the reaction between the peroxide and the vinyl compound.

The concentration of the benzoyl peroxide catalyst may be suitably in the range of between about 1.0 and about 0.01 percent by weight of the polymer-in-monomer solution, preferably between about 0.1 and about 0.8 percent by weight.

The solution comprising the alpha-olefin polymer, polymerizable styrene monomer, and benzoyl peroxide is admixed with an aqueous medium, while under conditions of continuous agitation, so as to form a suspension of the monomer solution in the aqueous medium. The aqueous medium with which the polymer-peroxide-monomer solution is admixed preferably comprises water and various suspending agents that assist in the formation of the spherical droplets of the monomer solution in the aqueous medium. Suitable suspending agents include, for example, stearic acid, polyvinyl alcohol, sodium sulfate, sodium lauryl sulfate, diamyl sodium sulfosuccinate, sodium disecondary-butyl-naphthalene sulfonate, dodecylamine hydrochloride, dodecylamine sulfate, the sodium salt of an alkyl aryl polyether sulfate (Triton X–770), a partially neutralized polyacrylic acid (Tamol 850), ethylene oxide condensate of nonylphenyl (Triton X–100), and combinations of the foregoing. In general, the foregoing suspending agents include long chain alkyl sodium sulfates; branched chain aliphatic or aromatic sodium sulfonates; salts or organic bases, such as amine and quaternary ammonium salts, polyhydroxides, and polyethers. The suspending agents may be utilized in concentration of between about 0.001 and about 5 percent, preferably between about 0.1 and about 0.3 percent by weight of the suspension system.

Additional components may be added to the suspension system of the present invention. Such components include surface-active agents, for example, sulfate esters of aliphatic alcohols ranging from 6 to 14 carbon atoms, such as caproyl sulfate or actyl sulfate in quantities usually up to 1.0 percent, e.g. between about 0.01 and about 0.5 percent. A lubricant may be added up to about 5 percent or between about 1 and 2 percent of a high molecular weight ester such as butyl stearate. A preferred additive for the suspension system of the present invention is a soap such as sodium lauryl sulfate, sodium stearate and the like. Emulsifying agents such as those commonly employed in conventional emulsification polymerization processes may be suitably employed.

The monomer solution containing the preformed poly(alpha olefin) and peroxide catalyst is admixed with the aqueous medium, which contains additives such as polyvinyl alcohol, stearic acid and sodium lauryl sulfate, under conditions of continuous agitation. The agitation by means of a mechanical stirrer or the like, is continued until the liquid monomer solution is broken up into small droplets and continuously maintained over a period of a time period of several hours, e.g. between about 3 and about 30 hours, preferably between about 15 and about 25 hours.

The temperature of the suspension system is raised to the desired level so as to decompose the benzoyl peroxide and cause polymerization of the styrene and its concomitant grafting to the poly(alpha olefin). Suitable temperatures include those in the range of between about 60° and about 100° C., preferably in the range of between about 75° and about 95° C. The temperature of the aqueous medium may be relatively low when the suspension system is initially formed, and then the temperature of the system may be gradually raised to within the preferred range within an hour or two. However, it is preferred to heat the aqueous medium to a temperature within the preferred range and purge with nitrogen prior to admixture with the monomeric solution.

The temperature employed must be sufficiently high, viz, above 60° or 70° C. in order to decompose the benzoyl peroxide to free phenyl radicals, but should not be too high or the aqueous media will begin to boil. Temperatures above 100° C. may be employed, if desired, by using superatmospheric pressures. This, of course, will accelerate the polymerization reaction. The process may be also conducted under a reduced pressure. Likewise, the suspension polymerization may be carried out in an inert atmosphere, especially under nitrogen or carbon dioxide gases.

By conducting the graft polymerization reaction in a suspension system, tiny spheres or beads of the graft copolymeric product are formed which are easily recoverable. Also, the aqueous medium in which the beads are formed acts as a heat transfer medium to dissipate the heat of polymerization. On the other hand, if the mixture comprising polyolefin, styrene monomer and benzoyl peroxide were directly heated, a very hot, thick, solid mass would form. The result would be a solid block with poor heat transfer characteristics which would be very difficult to remove from the reactor. In contradistinction thereto, the present system provides solid copolymeric droplets that settle out of their aqueous environment as spherical beads with essentially no tendency to cohere to each other.

An organic medium cannot be substituted for the aqueous medium in the present process, since the benzoyl peroxide initiator would react with the organic medium to graft the polystyrene onto the organic medium molecule.

The graft copolymeric product of the invention that is produced by the method described above, contains ungrafted polystyrene intermingled with the graft copolymer. The ungrafted polystyrene can be solvent extracted from the bead-like product. However, it is highly preferred not to remove it from the product. As heretofore noted, the presence of the ungrafted polystyrene greatly improves the impact properties of the graft copolymeric product. Accordingly, a preferred embodiment of the present invention is a polymeric product comprising a graft copolymer of polyhexene and polystyrene with free, ungrafted polystyrene intermingled therewith.

The following examples serve to further illustrate the invention, but they are not intended to limit it thereto.

The percentages are by weight unless otherwise stated.

EXAMPLE 1

Hexene-1 in the amount of 5.38 kilograms, is admixed with 21.8 kilograms of n-heptane, 19.1 grams of titanium trichloride, and 26.3 cubic centimeters of aluminum triethyl in a 20 gallon polymerization reactor. The mixture is heated at a temperature of 60° C. for a period of 3 hours. Precipitation is induced by the addition of 500 cubic centimeters of methanol for a period of 15 minutes at 60° C.

The resulting polyhexene is dried in a vacuum oven at a temperature of 50° C. for a period of 24 hours. A yield of 56.8 grams of polyhexane is recovered which corresponds to a 98.5 percent yield. The polyhexane has a dilute solution viscosity (DSV) of 1.89.

EXAMPLE 2

Ten grams of the polyhexene produced in Example 1 are dissolved in 150 grams of styrene to form a monomeric solution. After the polyhexene is completely dissolved, one gram of benzoyl peroxide is added to the solution. Meanwhile, an aqueous medium comprising 0.1 gram of sodium lauryl sulfate, 1 gram of polyvinyl alcohol, 5 grams of sodium sulfate and 1.5 grams of stearic acid in 500 milliliters of distilled water is prepared and placed in a one liter reaction kettle.

The aqueous medium is heated to reflux while being purged with nitrogen. The temperature is then reduced to 80° C. The monomeric solution is then added to the kettle with stirring so as to cause small droplets to be suspended in the aqueous phase. The suspension is maintained at 80° C. for a period of 24 hours with the droplets forming solid beads. A yield of 135.3 grams of the bead-like graft copolymer is produced.

Extraction of a portion of the product with methyl ethyl reveals that it contains free ungrafted polystyrene.

EXAMPLE 3

For comparaive purposes, a mixture of polyhexene and polystyrene is prepared by dissolving 5 grams of polyhexene and 75 grams of polystyrene in benzene. The mixture is then shaken vigorously and precipitated in methyl alcohol.

The resulting polymer is dried in a vacuum oven at a temperature of 50° C. A synthetic blend containing 6 percent polyhexene and 94 percent polystyrene is recovered and verified by extraction with methyl ethyl ketone, i.e. 6 percent of the portion extracted is insoluble in the ketone.

EXAMPLES 4–6

Portions of a polyhexene-polystyrene graft copolymer produced from a mixture containing 10 percent polyhexene in the manner of Example 2, the polyhexene-polystyrene synthetic blend of Example 3 and molding grade, high impact polystyrene that is prepared by a free radical transfer process are compression molded into sheets. The sheets are cut into bars and the physical properties of each are tested on the strips.

TABLE A

| Example Number | Polymer | Heat deflection (° C.) | Flexural strength (p.s.i.) | Impact strength, ft. lb./in. (of notch) [1] |
|---|---|---|---|---|
| 4 | Graft | 80 | 18,170 | 0.41 |
| 5 | Synthetic blend | 68 | 4,900 | 0.24 |
| 6 | Polystyrene | 93 | 9,580 | 0.16 |

[1] Izod impact test ASTM D 256–56.

Upon reviewing Table A, it may be seen that the compression-molded graft copolymer (Example 4) of the present invention, wherein the styrene is grafted to the polyhexene and contains ungrafted polystyrene, has an impact strength which is practically triple that of polystyrene, alone, and practically double that of an ungrafted mixture of polyhexene and polystyrene. Meanwhile, the flexural strength of the graft copolymer product is nearly double that of polystyrene and more than triple that of the blend.

The following two examples illustrate, by comparison, the desirability of having ungrafted polystyrene present in the graft copolymer product.

EXAMPLE 7

A graft copolymer containing 45.5 percent styrene grafted to polyhexene is prepared according to the procedure of Example 2. Next, the resulting beads are extracted with methyl ethyl ketone in order to remove the free, ungrafted polystyrene. The tensile strength and impact strength of the product are measured and found to be 690 p.s.i. and 0.12 ft. lb./in., respectively.

EXAMPLE 8

The procedure of Example 7 is repeated, except that the resulting graft copolymeric beads are not ketone-extracted. Tensile strength and impact strength measurements on this product are found to be 2,070 p.s.i. and 0.41 ft. lb./in., respectively. Thus, the presence of ungrafted polystyrene in the product increases the tensile strength by almost a factor of 3 over that of the product of Example 7, while the impact strength is increased by more than a factor of 3.

EXAMPLE 9

One gram of polyvinyl alcohol, 0.10 gram sodium lauryl sulfate, 5 grams of sodium sulfate, and 1.50 grams of stearic acid are mixed with 500.0 milliliters of distilled water. The mixture is added to a one liter resin kettle and heated at 100° C. for 20 minutes while passing a stream of nitrogen through the system.

The temperature is decreased to room temperature and a solution containing 10 grams of polyhexene (1.89 DSV), 0.25 gram lauryl peroxide and 150 grams of styrene are added to the kettle. The reaction mixture is heated slowly to 80° C. with continuous agitation over a period of 24 hours.

The resulting beads are dried and tested. Analysis of the beads indicate that the free radical $CH_3(CH_2)_{10} \cdot$ resulting from the lauroyl peroxide is incapable of polymerizing the styrene and grafting the polystyrene onto the polyhexene as does the benzoyl peroxide. The resulting polymeric material contains only ungrafted lauroyl polystyrene and a graft copolymer is not produced.

EXAMPLE 10

A suspension copolymerization process following the procedure of Example 2 is conducted substituting 10 grams of $C_{20}$ to $C_{26}$ alpha-olefin mixture for the polyhexene employed in that example.

A bead-like copolymer product is obtained having good impact properties.

EXAMPLES 11

The procedure of the previous example is repeated except that the polymer of 1-decene is employed instead of the $C_{20}$ to $C_{26}$ mixture, and o-methylstyrene is substituted for styrene. The product has good impact and flexural properties.

EXAMPLE 12

The foregoing procedure is repeated employing poly-1-octene in a solution of 3-chlorostyrene. The resulting beads are compression molded and tested as before. The test results indicate a high impact strength and other physical properties similar to the other molded graft polymeric material of the present invention.

Of course, useful coloring compounds, dyes, fillers and other additives may be added to the monomer solution before polymerization, or these additives may be added to the product beads. Likewise, the size of the beads may be varied by means known to the art including the exercise of control of the speed of agitation upon adding the monomer solution to the aqueous medium, and during the polymerization reaction.

The graft copolymer product of the present invention may be employed in the manufacture of high strength injection and compression moldings, in the manufacture of extruded sheets and of other high strength articles by methods known to the art.

The above descriptions and examples are set forth for the purpose of illustration only. Many variations and modifications thereof will be apparent to those skilled in the art and can be made without departing from the spirit and scope of the invention herein described.

I claim:
1. A method for the production of a praft polymer of a polymerizable styrene monomer which comprises providing a solution consisting essentially of a homopolymer of an alpha-olefin monomer containing between about 6 and about 28 carbon atoms in a polymerizable styrene monomer having the formula

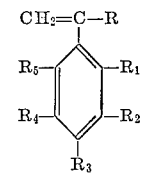

wherein R, $R^1$, $R^2$, $R^3$, $R^4$, and $R^5$ are the same or different and represent hydrogen, an alkyl group, an alkoxy group, a halogeno group or a cyano group, wherein the weight ratio of the styrene monomer to the polymer of the alpha-olefin is within the range of between about 5:1 and about 50:1,
  admixing a benzoyl peroxide free radical initiator with said solution, suspending the resulting solution in an aqueous medium, and heating the suspension to a temperature in the range of about 60° to about 100° C.

2. The method of claim 1 wherein the weight ratio of the styrene monomer the the polymer of the alpha-olefin is within the range of between about 10:1 and about 20:1.

3. The method of claim 1 wherein the polymer is poly-1-hexene.

4. The method of claim 1 wherein the polymerizable styrene monomer is styrene.

5. The method of claim 1 wherein the aqueous medium comprises water and a suspending agent.

6. The method of claim 5 wherein the suspending agent is a member selected from the group consisting of polyvinyl alcohol, stearic acid, sodium sulfate and mixtures thereof.

7. The method of claim 1 wherein the suspension is maintained at a temperature of between about 60° C. and about 100° C. while under continuous agitation.

8. A method for the production of a bead-like graft polymeric product which comprises providing a solution consisting essentially of a homopolymer of an alpha-olefin monomer having between about 6 and about 28 carbon atoms in a polymerizable styrene monomer having the formula

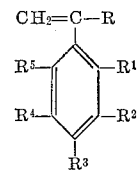

wherein R, $R^1$, $R^2$, $R^3$, $R^4$ and $R^5$ are the same or different and represent hydrogen, an alkyl group, an alkoxy group, a halogeno group or a cyano group, wherein the weight ratio of the styrene monomer to the polymer of the alpha-olefin is within the range of between about 5:1 and about 50:1,
  admixing a benzoyl peroxide free radical initiator with said solution, suspending the resulting solution in an aqueous medium in the form of finely dispersed droplets, heating the suspension to a temperature in the range of about 0° to about 100° C. with agitation until the poly(alpha olefin) and polymerizable styrene monomer copolymerize to the form of small substantially even-sized beads.

9. The method of claim 8 wherein the weight ratio of the styrene monomer to the polymer of the alpha-olefin is within the range of between 10:1 and about 20:1.

10. The method of claim 8 wherein the polymer is poly-1-hexene.

11. The method of claim 8 wherein the polymerizable styrene monomer is styrene.

12. The graft copolymer as produced by the method of claim 1.

13. The graft copolymer as produced by the method of claim 3.

14. The graft copolymer beads as produced by the method of claim 8.

15. The graft copolymer beads as produced by the method of claim 10.

References Cited

UNITED STATES PATENTS

| | | | |
|---|---|---|---|
| 2,964,456 | 12/1960 | Saunders et al. | 260—29.60 L |
| 3,228,896 | 1/1966 | Canterino et al. | 260—878 X |
| 3,316,199 | 4/1967 | Murphy | 260—29.6 |
| 3,444,270 | 5/1969 | Aliberti et al. | 260—878 |

FOREIGN PATENTS

| | | | |
|---|---|---|---|
| 633,890 | 1/1962 | Canada | 260—878 |

MURRAY TILLMAN, Primary Examiner

H. ROBERTS, Assistant Examiner

U.S. Cl. X.R.

260—23 S, 29.6 XA, NR, RB, WA, 878 R

PO-1050
(5/69)

UNITED STATES PATENT OFFICE
CERTIFICATE OF CORRECTION

Patent No. 3,632,673                      Dated January 4, 1972

Inventor(s) William J. Heilman

It is certified that error appears in the above-identified patent and that said Letters Patent are hereby corrected as shown below:

Claim 8, Column 9, line 3, delete "0°" and insert --60°-- .

Signed and sealed this 8th day of August 1972.

(SEAL)
Attest:

EDWARD M. FLETCHER, JR.          ROBERT GOTTSCHALK
Attesting Officer                 Commissioner of Patents